United States Patent [19]

Hwu

[11] Patent Number: 5,429,538

[45] Date of Patent: Jul. 4, 1995

[54] MECHANISM CAPABLE OF MAKING VARIATION IN RADIAL ANGLE

[76] Inventor: Chyn-Herng Hwu, 1 Fl., No. 14, Alley 65, Lane 134, Sec. 3, Shin-Yi Rd., Taipei, Taiwan

[21] Appl. No.: 245,708

[22] Filed: May 18, 1994

[51] Int. Cl.⁶ .......................................... A63C 15/03
[52] U.S. Cl. .................................................. 441/77
[58] Field of Search ...................... 441/65, 68, 70, 75, 441/76, 77, 79; 440/13, 21

[56] References Cited

U.S. PATENT DOCUMENTS

| | | | |
|---|---|---|---|
| 4,353,703 | 10/1982 | D'Elloy | 440/21 |
| 4,576,580 | 3/1986 | Gulko | 440/21 |
| 4,892,493 | 1/1990 | Gil | 440/21 |
| 5,080,621 | 1/1992 | Nayes | 441/77 |

*Primary Examiner*—Stephen P. Avila
*Attorney, Agent, or Firm*—Merchant, Gould, Smith, Edell, Welter & Schmidt

[57] ABSTRACT

The present invention relates to a mechanism capable of making variation in radial angle, in particular, to a mechanism wherein variations in the angle of rotation of a particular component would result in the variations in radial angle of another component. By such arrangement, the acting area of the mechanism can be radially extended or retracted. The mechanism comprises primarily a swing bar, an extendable bar, a push bar, a rotatable bar, a connecting bar, a support bar, and a plurality of fulcrums. In the mechanism, the swing bar and rotatable bar are provided with a fixed fulcrum each such that these bars can only swing about the fixed fulcrums. The remaining components are coupled to each other by means of movable pivots, so that the swing bar may change its angle of rotation to extend the extendable bar radially. If the extendable bar is replaced by an extendable plate, an expended area extending in the radial direction will result.

7 Claims, 8 Drawing Sheets

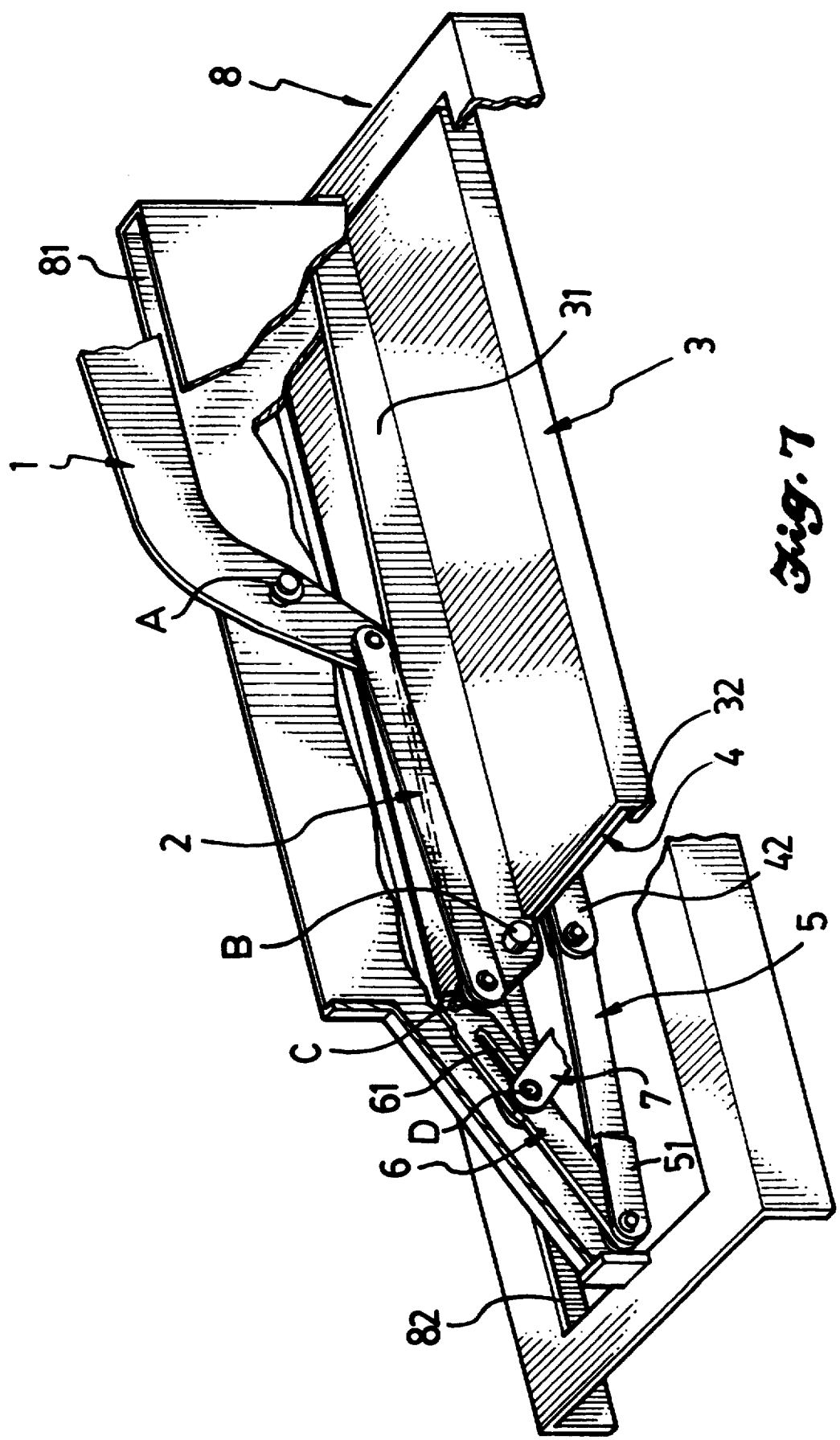

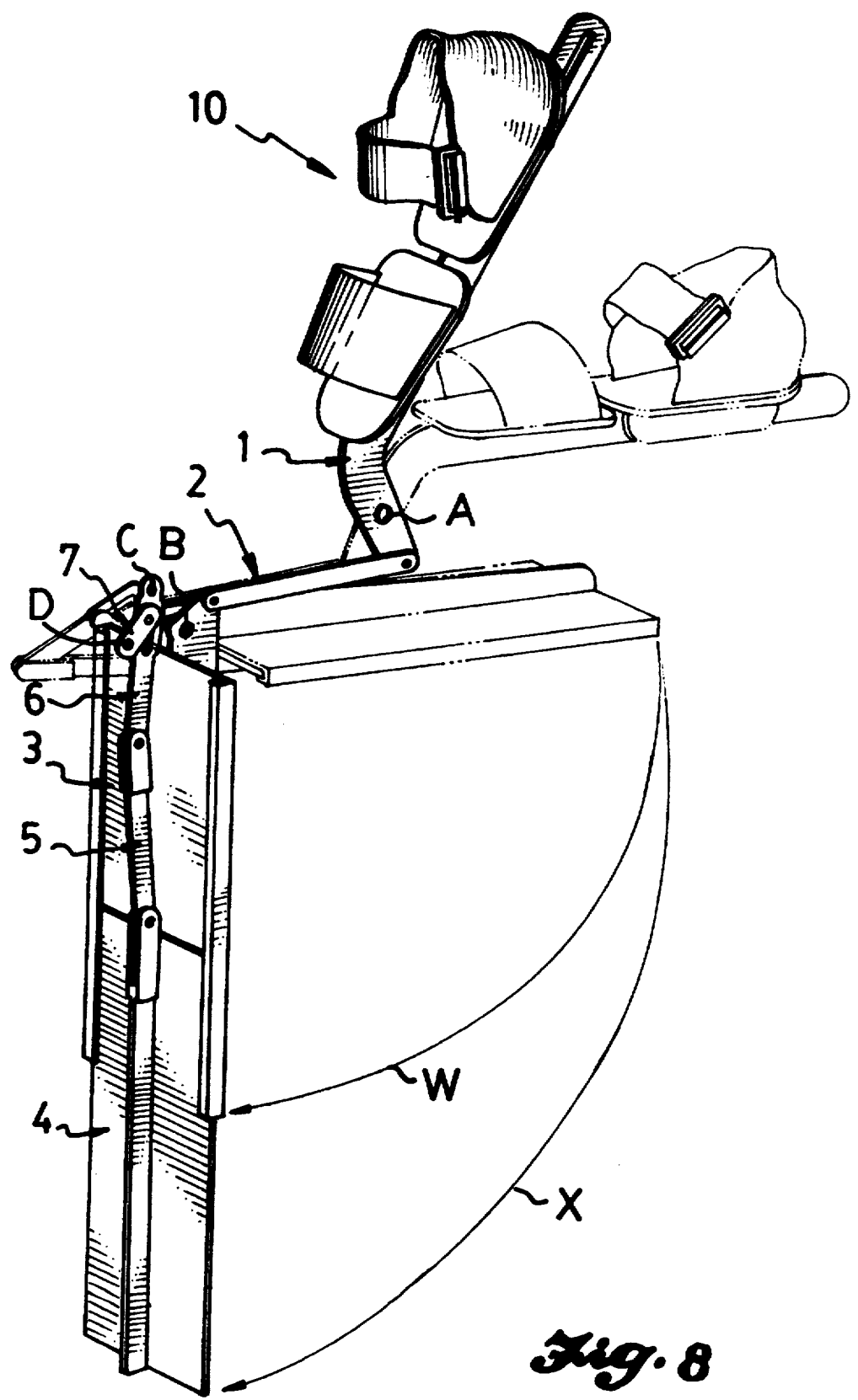

MECHANISM CAPABLE OF MAKING VARIATION IN RADIAL ANGLE

BACKGROUND OF THE INVENTION

The present invention relates to a mechanism capable of making variation in radial angle. As being subject to a force, a component of the invention will swing to change in its radial angle, thereby making radial extension or retraction which result in expansion or reduction of area accordingly.

In most of the articles used in our domestic life, they often make use of fulcrums or pivots to effect the swinging motion thereof. For example, the closing and opening of a door or window having pivot joints, and the extension of a box or shade. All the motions, in addition to having fulcrums or pivots, are common in that the radii or areas of the articles in motion will remain unchanged during the motion.

As a particular article is subject to radial change with the radius and area thereof subject to uniform curvilinear extension or retraction simultaneously, further utilities may be achieved. For example, reduction in area as the article is closed may reduce the occupying space, increase in area as the article is extended will increase the acting area. Take the rowing action for example, if the acting surface of an oar is enlarged during the rowing stroke and reduced during the withdrawal stroke, the best possible effect will be attained.

SUMMARY OF THE INVENTION

It is therefore an object of this invention to provide a mechanism capable of varying its radial angle so that the radius and total area thereof can be changed to obtain different effects during the extension and retraction actions.

The present invention is applicable on sporting goods, solar energy collector panels, doors for buildings and automobile, sunshades, or other devices intended for space utilization.

These and other objects, advantages and features of the present invention will be more fully understood and appreciated by reference to the written specification.

BRIEF DESCRIPTION OF THE DRAWINGS

Further understanding of this invention will become more apparent after referring to the following specification and attached drawings in which:

FIG. 7 is a perspective view of the mechanism of the floater according to the present invention; and FIG. 8 is a schematic view showing the mechanism of the floater in extended condition;

Referring to FIGS. 1 and 2, the mechanism according to the present invention is shown, respectively in its retracted and extended conditions. Said mechanism is generally comprised of a swing bar 3, an extendable bar 4, a push bar 5, a rotatable bar 6, a connecting bar 71 and a support bar 7. The swing bar 3, rotatable bar 6, and support bar 7 are pivotally positioned by means of fixed fulcrums (B), (C), and (D) such that said components can swing about their respective fixed fulcrums. The rotatable bar 6 are coupled to the push bar 5 through pivot (I), and the push bar 5 are coupled to the extendable bar 4 through pivot (J), so that relative movements can be achieved among the components. Therefore, when the swing bar 3 is swung for an angle of about 90 degrees taking the fixed fulcrum as the center, the extendable bar 4 is pushed to have its body extended from the swing bar 3 under the restraint of the push bar 5 and the rotatable bar 6. The relative changes between the swing bar 3 and the extendable bar 4 during extension and retraction operations will be better understood with reference to FIG. 3.

FIG. 4 shows a modified embodiment of the present invention in its retracted condition. The device comprises a force applying bar 1, a pull bar 2, a swing plate 3', an extendable plate 4', a push bar 5, a rotatable bar 6, a connecting bar 71, and a support bar 7. With reference to FIGS. 4 and 5, it can be seen that the swing plate 3' and the extendable plate 4' are modified respectively from the swing bar 3 and extendable bar 4 disclosed in FIGS. 1 to 3. The force applying bar 1, swing plate 3', rotatable bar 6 and support bar 7 are pivotally positioned by means of the fixed fulcrums (A), (B), (C), and (D) respectively so that said components can swing about their respective fixed fulcrums. Besides, the force applying bar 1 is pivotally connected to the pull bar 2 through movable pivot (F), pull bar 2 connected to swing plate 3' through pivot (G), rotatable bar 6 connected to push bar 5 through pivot (I), and push bar 5 connected to extendable plate 4' through pivot (J). A channel 32 is provided within the swing plate 3' so that the extendable plate 4' may slide therein. When the pull bar 2 is moved by the force applying bar 1, rendering the swing plate 3' to swing for an angle of about 90 degrees about the fixed fulcrum (B), the extendable plate 4', which is originally located within the channel 32, will be pushed to have its major area extended from the swing plate (see FIGS. 4 and 5).

In order that the invention may accomplish the aforementioned functions, the following features must be taken into consideration: The arm of force of the force applying bar 1 should be greater than the arm of resistance thereof, so that forces can be easily applied. The movable pivot (G) should be close to the fixed fulcrum (B), so that the swing plate 3' can be easily swung for a large angle. The swing plate 3' is effected to move by pull bar 2 and force applying bar 1, and the extendable plate 4' moved by push bar 5 and rotatable bar 6. The extendable plate 4' hidden within the swing plate 3' is designed to be slidable therein, so that the extendable plate 4' can be extended or retracted during the swinging motion of the swing plate 3'.

Figure 1:
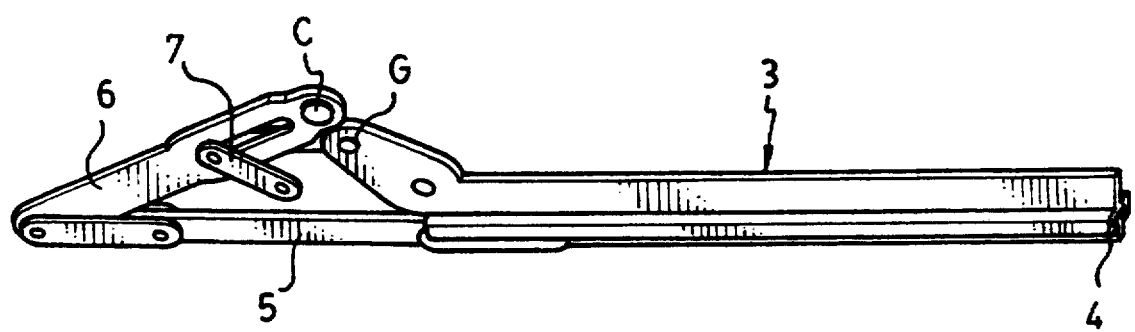
FIG. 1 is a perspective view of the mechanism according to the present invention in the retracted condition.
Figure 2:
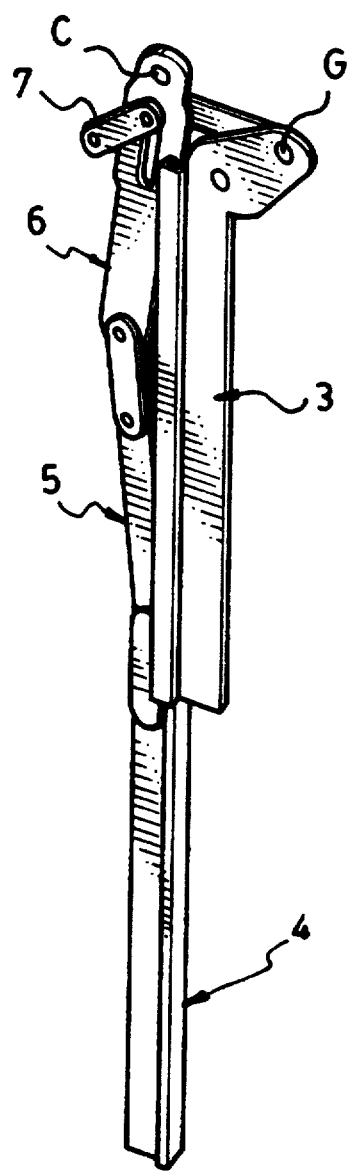
FIG. 2 is a perspective view of the mechanism according to the present invention in the extended condition.
Figure 3:
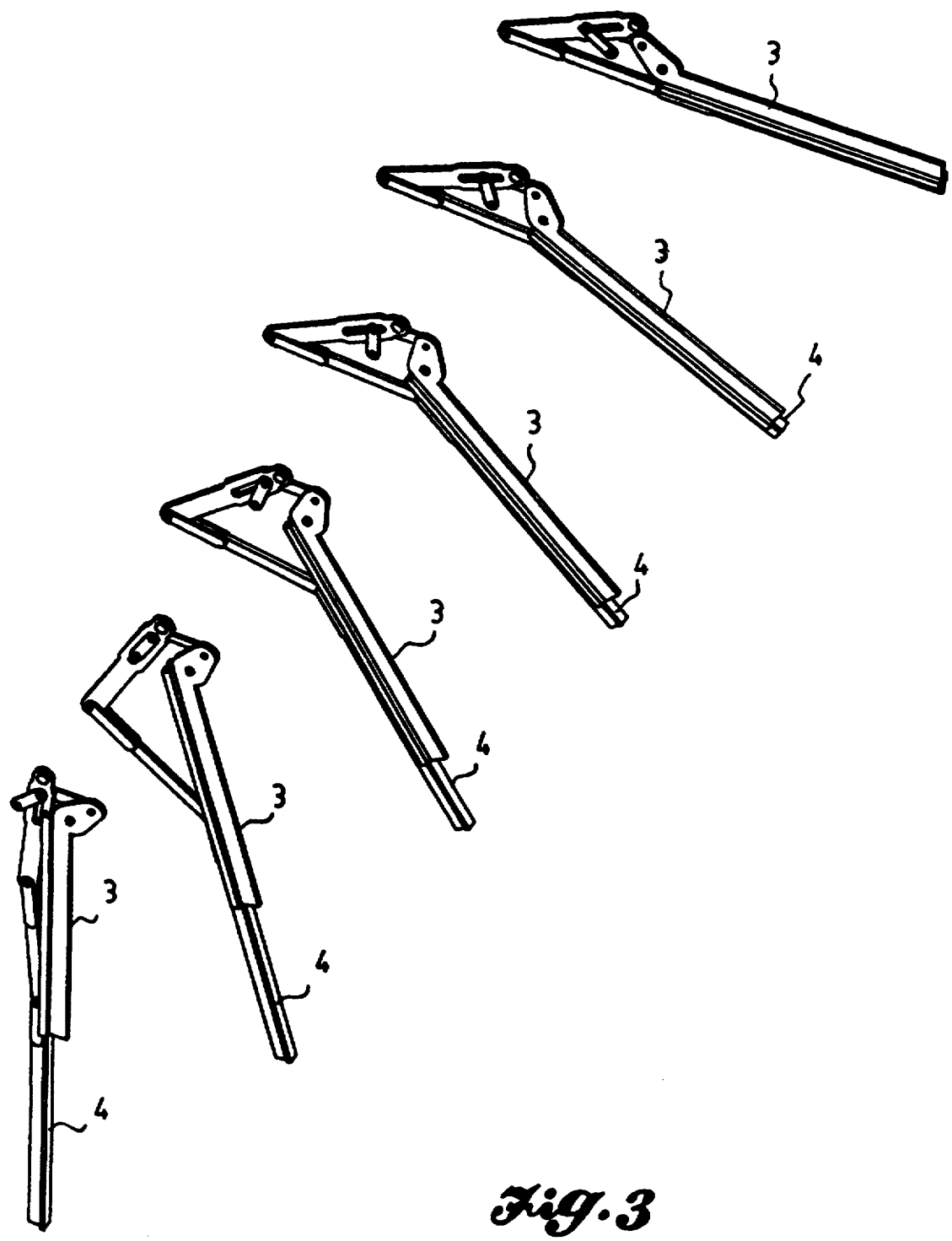
FIG. 3 is a schematic view showing the changes in the relative angle and the radial length of respective components of the mechanism according to the present invention from the extended condition to the retracted condition.
Figure 4:
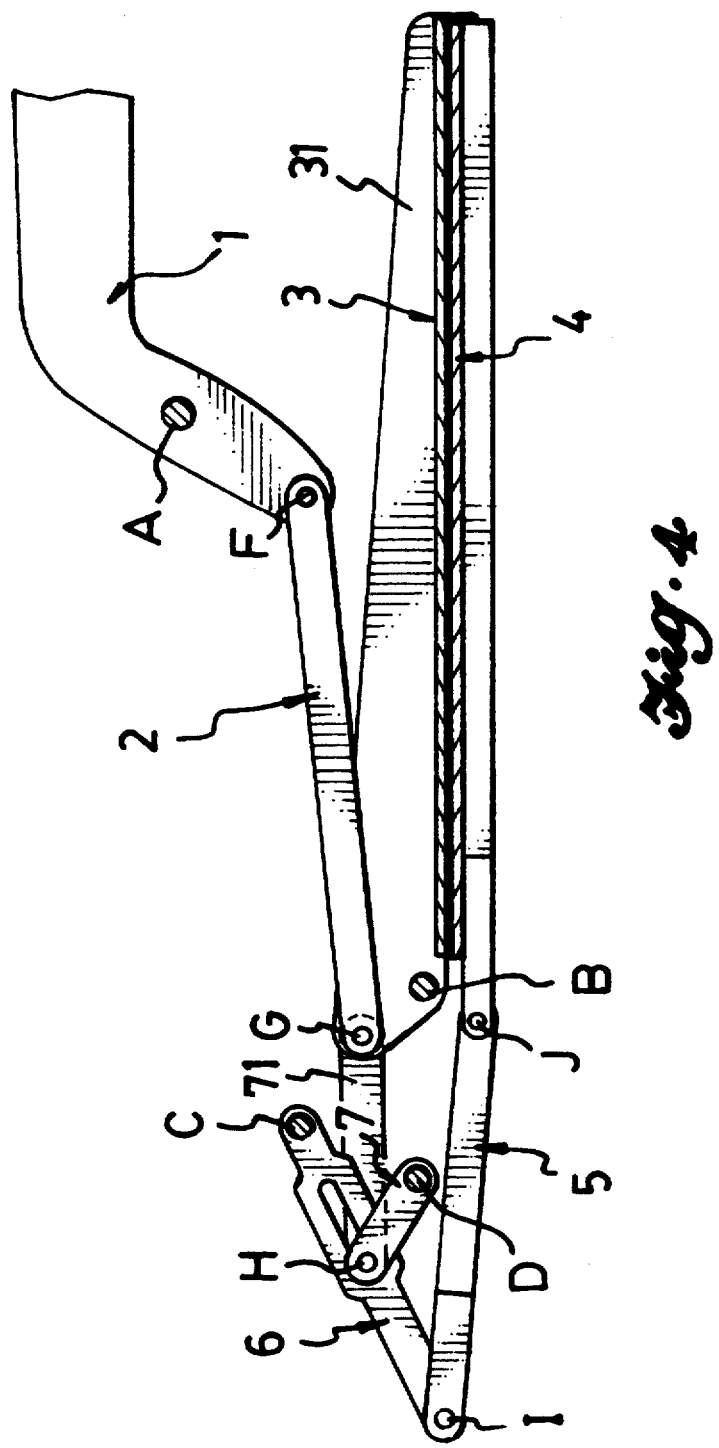
FIG. 4 is a plan view of an embodiment according to the present invention in the retracted condition.
Figure 5:
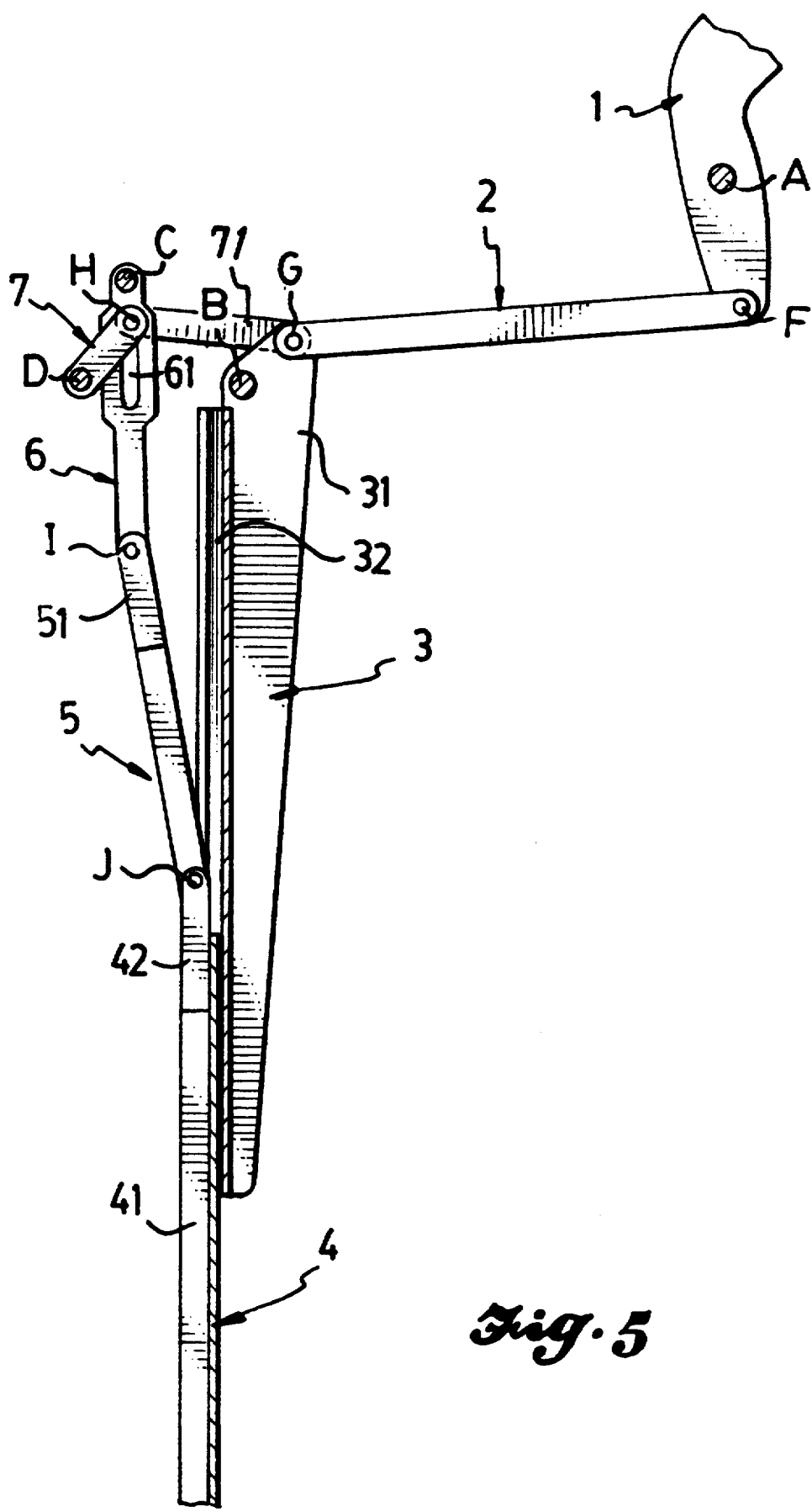
FIG. 5 is a plan view of the embodiment according to the present invention in the extended condition.
Figure 6:
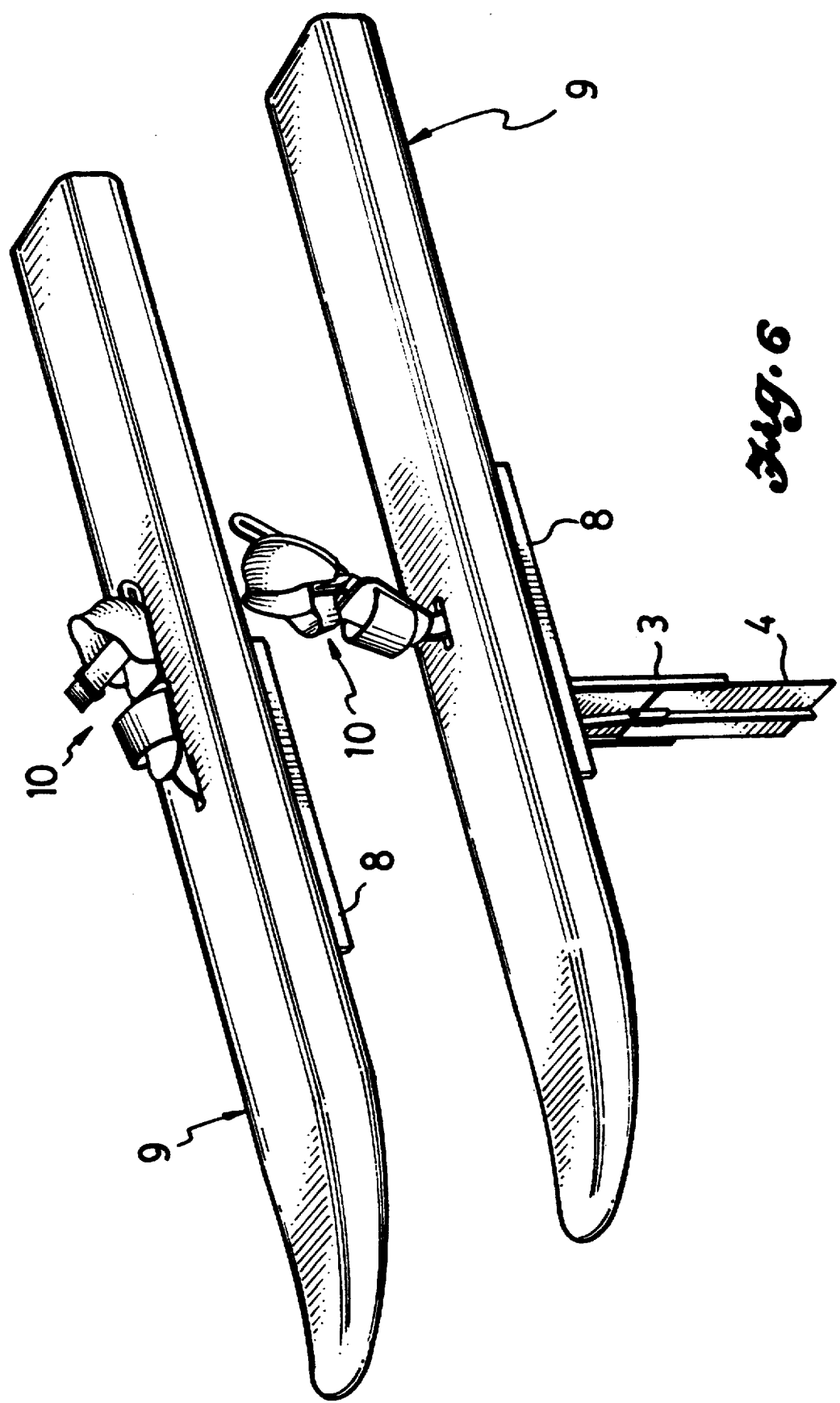
FIG. 6 is a perspective view of a floater according to the present invention.

Plates which are capable of making radial changes by such angular changes can be used in a number of static or dynamic mechanisms. For example, as shown in FIG. 6, a twin plate floater 9 has a structure of the present invention stored internally under respective plates. As shown, the arm of force of the force applying bar 1 extends beyond the surface of the twin plate floater 9, and a foot retainer 10 is provided on the arm of force. The twin plate floater 9 can bear the body weight of a user for floating over the water surface. The feet of the user are retained in the foot retainer 10. When the heels of both feet move up and down, the swing plate 3', which is hidden under the bottom of the twin plate floater 9 initially, will swing down to become perpendicular to the twin plate floater 9. The extendable plate 4' also extends to present its maximal area as the swing plate swings to an angle perpendicular to the floater. As shown in the drawings, when the swing plate 3' and the extendable plate 4' are orientated to a position perpendicular to the floater 9, the force applying bar 1 and foot retainer 10 are at an inclined up angle. At this moment, the feet is in a position where forces may be applied by stepping backward. At this instant, the large vertical faces of the swing plate and the extendable plate extending into the water provide sufficient resistance such that the floater will not move backward due to the forces exerted by the feet stepping backward. In other words, the body will obtain sufficient reaction forces from such stepping backward movement such that the body can move forward by moving the other foot secured in one of the floater. Such a motion is similar to walking or cycling wherein the force resulted from alternate backward stepping of the feet may convert into forward driving force. Thus a new style of water sport is provided.

The aforementioned mechanism and its application can be better understood with reference to FIGS. 7 and 8. The mechanism can be installed in a frame 8 (see FIG. 8) which includes an upright groove 81 at the upper portion thereof. Fulcrums A, B, C, and D are positioned on the side walls of the groove 81. The force applying bar 1 projects beyond the groove 81 and movable when being subjected to a force, while the pull bar 2 is movable within the groove 81. A flat frame 82 lies below the groove 81. The swing plate 3' is received within the frame 82. An upright plate-like ridge 31 is provided atop the swing plate 3' at the intermediate portion thereof. The fixed fulcrum (B) and the movable pivot (G) are provided at the front end of the ridge 31. When this mechanism is in its retracted condition, the rotatable bar 6 and the push bar 5 forms a small included angle therebetween so that the extendable plate 4' can be retracted in the channel 32 of the swing plate 3'. A rib-like rod 41 attached to the bottom portion of the extendable plate 4' is pivotally connected to the push bar 5 via pivot (J). A short support bar 7 is provided with the fixed pivot (D) for pivotal connection. The other end of the support bar 7 can slidably move within a slot 61 by means of the movable pivot (H), thus allowing the support bar 7 to rotate and change in direction according to the orientation of the rotatable bar 6. The frame 8 is secured underneath the floater 9 so that the swing plate 3' and the extendable plate 4' can swing down to its vertical position.

With reference to FIG. 8, one can further appreciate the operation of the mechanism. When the foot retainer 10 is raised, the swing plate 3' swings down vertically and the extendable plate 4' is extended to present its maximum area. When the foot retainer 10 is in a level position (as shown by the imaginary line), the swing plate 3' swings back to its horizontal position and the extendable plate 4' is withdrawn and hidden within the swing plate 3'.

In addition to the above embodiment for use in water sport, the present invention can also be used for retractable sunshades, extendable box lids, billboards etc.

While the invention has been described with respect to certain preferred embodiments, it is not intended to limit the scope of the invention thereby, but solely by the claims appended hereto.

What is claimed is:

1. A mechanism capable of making variation in radial angle comprising:
   a swing bar having a channel provided at the bottom thereof, one end of the swing bar being positioned by a fixed fulcrum;
   an extendable bar slidably positioned within the channel of the swing bar;
   a push bar, one end of which being pivotally connected to the extendable bar;
   a rotatable bar, one end of which being pivotally connected to the other end of the push bar, and the other end thereof being positioned by a fulcrum, said other end being further pivotally connected to the swing bar by means of a connecting bar;
   wherein the swing bar is capable of swinging a predetermined angle about the fixed fulcrum when a force is exerted thereon, and the extendable bar is capable of extending from the channel of the swing bar to present the maximum area thereof during the swinging motion of the swing bar.

2. A mechanism capable of making variation in radial angle comprising:
   a force applying bar positioned by means of a fixed fulcrum for rotation;
   a pull bar, one end of which being pivotally connected to the force applying bar;
   a swing plate, one end of which being positioned by means of a fixed fulcrum, and being pivotally connected to the other end of the pull bar adjacent to the fulcrum;
   a channel provided at the bottom portion of the swing plate;
   an extendable plate received within the channel and is capable of sliding therein;
   a push bar, one end of which being pivotally connected to one end of the extendable plate;
   a rotatable bar, one end of which being positioned by means of a fixed fulcrum and pivotally connected to the swing plate by a connecting bar; and the other end of which being pivotally connected to the other end of the push bar; wherein the force applying bar is capable of moving the pull bar and the swing plate when a force is being applied thereon; the swing bar is capable of swinging a predetermined angle about the fixed fulcrum, and the extendable bar is capable of extending from the channel of the swing bar to present the maximum area thereof during the swinging motion of the swing bar.

3. The mechanism according to claim 1, wherein a slot is provided on the rotatable bar to receive one end of a support bar, said one end of the support bar being pivotally and slidably disposed within the slot so as to limit the range of rotation of the rotatable bar.

4. The mechanism according to claim 2, wherein the arm of force of the force applying bar is coupled to a power device to provide the torque for turning.

5. The mechanism according to claim 2, wherein the mechanism is installed in a frame, the frame is particularly designed to accommodate the entire swing plate in retracted condition.

6. The mechanism according to claim 5, wherein a foot retainer is provided on the force applying force, and the frame is disposed underneath a floater; the swing plate and the extendable plate are capable of swinging to be perpendicular to the floater under the water surface in corresponding to the stepping motion of the foot retainer; thereby obtaining the reaction force for moving the floater forward.

7. The mechanism according to claim 2, wherein a slot is provided on the rotatable bar to receive one end of a support bar, said one end of said support bar being pivotally and slidably disposed within the slot so as to limit the range of rotation of the rotatable bar.

* * * * *

UNITED STATES PATENT AND TRADEMARK OFFICE
CERTIFICATE OF CORRECTION

PATENT NO. : 5,429,538

DATED : July 4, 1995

INVENTOR(S) : Hwu

It is certified that error appears in the above-identified patent and that said Letters Patent is hereby corrected as shown below:

```
Col. 4, line 13 insert --first-- after the word "a"

Col. 4, line 20 insert --second fixed-- after the word "a"

Col. 4, line 24 insert --first-- after the word "the"

Col. 4, line 31 insert --first-- after the word "a" (2nd occur).

Col. 4, line 37 insert --second-- after the word "a"

Col. 4, line 39 insert --second fixed-- after the word "the"

Col. 4, line 47 insert --third-- after the word "a"

Col. 4, line 53 "bar" should read --plate--

Col. 4, line 54 insert --first-- after the word "the"

Col. 4, line 56 "bar" should read --plate--

Col. 4, line 58 "bar" should read --plate--
```

Signed and Sealed this

Seventeenth Day of December, 1996

*Attest:*

BRUCE LEHMAN

*Attesting Officer*     *Commissioner of Patents and Trademarks*